US009132501B2

(12) United States Patent
Lennartsson et al.

(10) Patent No.: US 9,132,501 B2
(45) Date of Patent: Sep. 15, 2015

(54) ARC WELDING METHOD AND APPARATUS FOR ARC WELDING

(75) Inventors: Daniel Lennartsson, Örebro (SE); Tomas Johansson, Laxå (SE); Ulf Andrén, Röfors (SE); Bo Melin, Laxå (SE)

(73) Assignee: ESAB AB, Gothenburg (SE)

( * ) Notice: Subject to any disclaimer, the term of this patent is extended or adjusted under 35 U.S.C. 154(b) by 917 days.

(21) Appl. No.: 13/146,320

(22) PCT Filed: Feb. 24, 2009

(86) PCT No.: PCT/SE2009/000106
§ 371 (c)(1),
(2), (4) Date: Aug. 23, 2011

(87) PCT Pub. No.: WO2010/098700
PCT Pub. Date: Sep. 2, 2010

(65) Prior Publication Data
US 2012/0043307 A1    Feb. 23, 2012

(51) Int. Cl.
B23K 33/00      (2006.01)
B23K 9/28       (2006.01)
B23K 9/18       (2006.01)

(52) U.S. Cl.
CPC ..................... B23K 9/188 (2013.01)

(58) Field of Classification Search
USPC .................... 219/136, 137 R, 137.2
See application file for complete search history.

(56) References Cited

U.S. PATENT DOCUMENTS

| 2,583,507 | A | * | 1/1952 | Carpenter et al. | ........ 219/137.71 |
| 2,837,627 | A | * | 6/1958 | Soulary | ..................... 219/137 R |
| 3,931,489 | A | * | 1/1976 | Roderburg et al. | ......... 219/60 R |
| 5,214,265 | A | | 5/1993 | Pollack | |
| 5,550,347 | A | * | 8/1996 | Kasuya et al. | ............ 219/137 R |

(Continued)

FOREIGN PATENT DOCUMENTS

| GA | 711828 | 7/1954 |
| GB | 839203 | 6/1960 |

(Continued)

OTHER PUBLICATIONS

International Search Report (PCT/ISA/210) issued on Oct. 20, 2009, by Swedish Patent Office as the International Searching Authority for International Application No. PCT/SE2009/000106.

(Continued)

*Primary Examiner* — Sang Y Paik
(74) *Attorney, Agent, or Firm* — Kacvinsky Daisak Bluni PLLC

(57) ABSTRACT

An electric arc welding method is provided, wherein an electrode assembly comprises at least two fusible continuous electrodes acting on a workpiece for generating a weld pool via electric arcs, wherein the at least two electrodes are arranged in sequential order relative to a welding direction and laterally separated relative to each other, wherein steps are performed of monitoring at least one stability parameter (Stab_par) for each electrode of the electrode assembly; determining if one electrode of the electrode assembly violates a stability criterion (Crit); separating at least temporarily the one electrode violating the stability criterion (Crit) from one or more adjacent electrodes when a violation of the stability criterion (Crit) of the one electrode is detected.

20 Claims, 3 Drawing Sheets

(56) References Cited

U.S. PATENT DOCUMENTS 6,940,039 B2 * 9/2005 Blankenship et al. ... 219/130.01
2009/0090702 A1 4/2009 Destouches

FOREIGN PATENT DOCUMENTS

JP 2005-342723 A 12/2005
WO WO 2007/066013 A1 6/2007

OTHER PUBLICATIONS

Written Opinion (PCT/ISA/237) issued on Oct. 20, 2009, by Swedish Patent Office as the International Searching Authority for International Application No. PCT/SE2009/000106.

* cited by examiner

ARC WELDING METHOD AND APPARATUS FOR ARC WELDING

TECHNICAL FIELD

The invention relates to an arc welding method and an apparatus for arc welding, particularly for submerged arc welding comprising an electrode assembly with a multitude of electrodes.

BACKGROUND OF THE INVENTION

Submerged arc welding is a fully mechanised welding method characterised by high productivity and quality, often used for longer welding seems in thicker materials. During submerged arc welding one or more sequentially arranged welding electrodes melt in arcs.

The weld, particularly the melted material and the arc, are protected beneath a layer of pulverised flux. The flux melts in part during the process, thus creating a protecting layer of slag on the weld pool. The electrical current used in the process is relatively high, usually within 300-1500 Ampere per electrode. The electrodes used in submerged arc welding are usually 2.5-6 mm in diameter.

Fluxes used in submerged arc welding are granular fusible minerals typically containing oxides of manganese, silicon, titanium, aluminium, calcium, zirconium, magnesium and other compounds such as calcium fluoride. The flux is specially formulated to be compatible with a given electrode wire type so that the combination of flux and wire yields desired mechanical properties. All fluxes react with the weld pool to produce the weld metal chemical composition and mechanical properties. It is common practice to refer to fluxes as 'active' if they add manganese and silicon to the weld, the amount of manganese and silicon added is influenced by the arc voltage and the welding current level.

To find the highest productivity possible with submerged arc welding, with increased competitiveness as one result, one strives for increased weld speed and the highest possible deposition rate, i.e. melted welding consumables, or really created joint material, per hour and electrode.

When welding with a single electrode, as opposed to multiple sequential electrodes, the upper limit is often reached, making further improvements in the welding productivity impossible by only changing the weld data. For instance, when increasing the weld current the arc finally becomes strong enough to push the weld pool resulting in unacceptable welds.

One solution to this known in the art is to use multiple electrodes, positioned sequentially in the direction of the weld seem. Usually 2-3 electrodes are used, however, usage of up to 6 electrodes is known.

Unfortunately a multiple electrode set-up is not problem-free as the individual arcs affect each other through so called "magnetic arc blow effect". This effect is caused by magnetic fields generated by the current flowing through adjacent electrodes. The "magnetic arc blow effect" affects an adjacent arc, making it deviate or deflect from the usual and wanted direction, which is in most cases perpendicular to the material and in line with the electrode. This deviation can cause the arc(s) to push the weld pool in an unfavourable way resulting in a wave-form weld and unacceptable overall results.

Furthermore the molten material in the weld pool is influenced by forces from the arcs forming a sensitive system that affects the pattern of waves in the weld pool. Fluid material is squeezed between the arcs so that the whole weld pool can be seen as a connected system of n−1 weld pools, n being the number of arcs.

To inhibit this phenomenon one known solution is to power the primer electrode with DC current while powering the sequential ones with AC current. Using AC current in these situations has been proven useful for a number of reasons. For instance, a shifting magnetic field does not reach the arc to the same extent, especially for instance in a deep weld joint, as vortexes in the base material inhibit the magnetic field dispersion, also with a directionally fluctuating magnetic field the arc deviations are no longer mono-directional, resulting in less impact on the weld pool. A further benefit with AC current on the sequential electrodes is an increased deposition rate.

Even though the above mentioned solutions increase the weld speed and deposition rate there appears to be an upper limit hard to surpass without jeopardising the quality of the welding result.

Pushing beyond the limit can cause instability in the welding process at the latter electrodes. This is expected to depend on the relatively larger weld pool found at this position caused by the melted consumables from the leading electrodes in combination with the push effect on the weld pool from the arcs. To a small degree this effect can be lessened by sequentially lowered weld currents used to power the latter electrodes, although the problem can not be fully avoided through this measure.

SUMMARY OF THE INVENTION

It is an object of the invention to provide an electrode assembly which allows for improved weld speed. Another object of the invention is to provide a method with an improved weld speed in conjunction with a satisfying weld quality. Another object is to provide an apparatus for performing such method.

The objects are achieved by the features of the independent claims. The other claims and the description disclose advantageous embodiments of the invention.

According to a first aspect of the invention, an electrode assembly is proposed for electric arc welding, comprising at least three fusible continuously-fed electrodes for generating a weld pool via electric arcs in a workpiece, wherein a weld head jaw is arranged for each of the at least three electrodes and wherein the at least three electrodes are arranged in sequential order with respect to a welding direction 30 when the electrode assembly is in an operating mode, characterized in that at least one of the trailing electrodes is geometrically separated from its leading electrode laterally and/or transversally compared to one or more foregoing electrodes of the leading electrode.

In conventional electrode assemblies, the weld head jaws and consequently the electrodes are equidistantly spaced and arranged along a line which is designed to be collinear with the weld seam during welding. Favourably, by manipulating the system of fluid material squeezed between the multitude of arcs through the distances between the arcs the system can be changed in a favourable way taking into account the changes the arc blow effect also undergoes with different weld head distances. By rearranging the electrodes in the electrode assembly, the welding speed can be improved without a detrimental effect of arc blow effects.

Favourably, the electrode to be separated from its leading electrode can be chosen in a design phase of the electrode assembly by modelling or by testing, resulting in a fixed layout of the electrode assembly. On the other hand, it is possible to monitor the electrodes during welding and rearranging the electrodes and the weld head jaws, respectively, online during welding.

According to a favourable embodiment of the invention, the trailing electrode can be separated from its leading electrode by a larger distance than a distance between the leading electrode and its foregoing electrode. The electrode assembly can still be aligned with the intended weld seam. Particularly, the distance is increased by a factor of 1.5, preferably by a factor between 2 and 10, more preferably by a factor between 2.5 and 5. The increased spacing results in a strong reduction of arc blow effects during high weld speeds.

According to a favourable embodiment of the invention, separating the electrode can be achieved by adjusting an angle between the electrodes. By tilting one or more electrodes an increased distance between the electrode to be separated and its leading electrode can be easily established. Preferably, the trailing electrodes with respect to the separated electrodes can be tilted likewise.

Additionally or alternatively, according to a favourable embodiment of the invention the trailing electrode can be separated from its leading electrode by an offset from a virtual line connecting the leading electrode and its foregoing electrode. In this case the separated electrode is offset from the other electrodes with respect to the weld seam.

According to a favourable embodiment of the invention, the separated electrode can be selected based on an estimation of an instability during a welding process. Expediently, the estimation can be done in a model phase during the design of the electrode assembly or by measurements of welding parameters for each electrode in the electrode assembly. In an adjustable electrode assembly, the separation can be done during the welding process.

According to a favourable embodiment of the invention, an actuator can be provided for separating the electrode during welding. This allows for separating one or more electrodes when an instability is observed or expected.

According to a favourable embodiment of the invention, in an electrode assembly of five electrodes the fourth electrode can be separated from the third electrode by a larger distance than an equidistant spacing between the other subsequent electrodes.

According to another aspect of the invention, an electric arc welding method is proposed, wherein an electrode assembly comprises at least two fusible continuous electrodes acting on a workpiece for generating a weld pool via an electric arc, wherein the at least two electrodes are arranged in sequential order relative to a welding direction and laterally separated by a distance relative to each other. At least one stability parameter for each electrode of the electrode assembly is monitored. It is determined if one electrode of the electrode assembly violates a stability criterion and the one electrode violating the stability criterion is separated at least temporarily from one or more adjacent electrodes when a violation of the stability criterion of the one electrode is detected.

By manipulating the system of liquid metal squeezed between arcs through the distances between arcs the system can be changed in a favourable way taking into account the changes the arc blow effects also undergoes with different weld head distances. Favourably, a detrimental influence of the electrode violating the stability criterion can be diminished and a satisfying weld quality can be maintained.

Monitoring the at least one stability parameter for each electrode of the electrode assembly can be done in a design phase of the electrode assembly thus providing a fixed electrode assembly design or can be done during the welding operation.

According to a favourable embodiment of the invention, separating the one electrode can be performed by increasing a distance between the one electrode violating the instability criterion and its foregoing electrode. Expediently, the electrode where the instability first occurs is separated from its leading electrode.

According to a favourable embodiment of the invention, a distance in lateral direction can be increased. Particularly, the distance can be increased by a factor of 1.5, preferably by a factor between 2 and 10, particularly by a factor between 2.5 and 5. The weld speed can be increased without reducing the weld quality as detrimental arc blow effects can be handled by increasing the distance between the electrode showing the instability and the leading electrode.

According to a favourable embodiment of the invention, a separation can be performed by shifting one or more electrodes in a transverse direction. Particularly, the one or more electrodes can be shifted by an amount of at least the lateral distance between the electrodes. In this case, the electrodes are no longer aligned along the welding direction but one or more electrodes can be arranged with an offset to the weld seam.

According to a favourable embodiment of the invention, separating the one electrode can be performed by adjusting an angle between the electrodes. Favourably, the distance between the one electrode violating the stability criterion to its leading electrode can easily be adjusted.

According to a favourable embodiment of the invention, separating the one electrode can be achieved by separating weld head jaws holding the electrodes. The separation of the one electrode can be easily achieved. Favourably, the weld head jaws can be moved by an actuator with high precision.

According to a favourable embodiment of the invention, an electric current through the electrodes can be monitored as stability parameter. The electric current and/or electric power through each electrode can be easily accessed with high accuracy.

According to a favourable embodiment of the invention, an arc voltage can be monitored as stability parameter. The arc voltage related to each electrode can be easily accessed with high accuracy.

According to a favourable embodiment of the invention, violation of the stability criterion is detected when the stability parameter of one or more of the electrodes changes by more than 5%, preferably by more than 10% with respect to the stability parameters of one or more adjacent electrodes.

According to a favourable embodiment of the invention, violation of the stability criterion is detected when the stability parameter of one or more of the electrodes changes by more than 5%, preferably by more than 10% with respect to the stability parameters of the trailing electrode compared to the foregoing electrode. Favourably, the electrode where an instability first occurs can be separated from its leading electrode and the stability of the welding process can be re-established.

According to a favourable embodiment of the invention, the separation of the one electrode can be performed during ongoing current flow through the electrodes. Favourably, the welding process is not interrupted and a high welding speed can be maintained.

According to another aspect of the invention an apparatus for performing an electric arc welding method is proposed, wherein an electrode assembly comprises at least two fusible continuous electrodes acting on a workpiece for generating a weld pool via an electric arc, wherein the at least two electrodes are arranged in sequential order relative to a welding direction and laterally separated by a distance relative to each other, wherein is provided a monitoring device for monitoring at least one stability parameter for each electrode of the electrode assembly; a unit for determining if one electrode of the electrode assembly violates a stability criterion; wherein the electrode assembly is adapted for separating at least temporarily the one electrode violating the stability criterion from one or more adjacent electrodes when a violation of the stability criterion of the one electrode is detected. The apparatus can be used for normal welding operation where the electrodes in the electrode assembly can be rearranged during welding or can be used for testing the electrode assembly providing a fixed arrangement of the electrodes in the electrode assembly.

According to a favourable embodiment of the invention, the electrode assembly can comprise adjustable weld head jaws for laterally and/or transversally adjusting the position of an individual electrode above a surface of the workpiece. Expediently, the electrodes and/or the weld head jaws can be positioned via one or more actuators.

According to a favourable embodiment of the invention, the electrode assembly can comprise pivotable weld head jaws with adjustable angles. A distance between electrodes can be easily adjusted.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION OF PREFERRED EMBODIMENTS OF THE INVENTION

Figure 1:
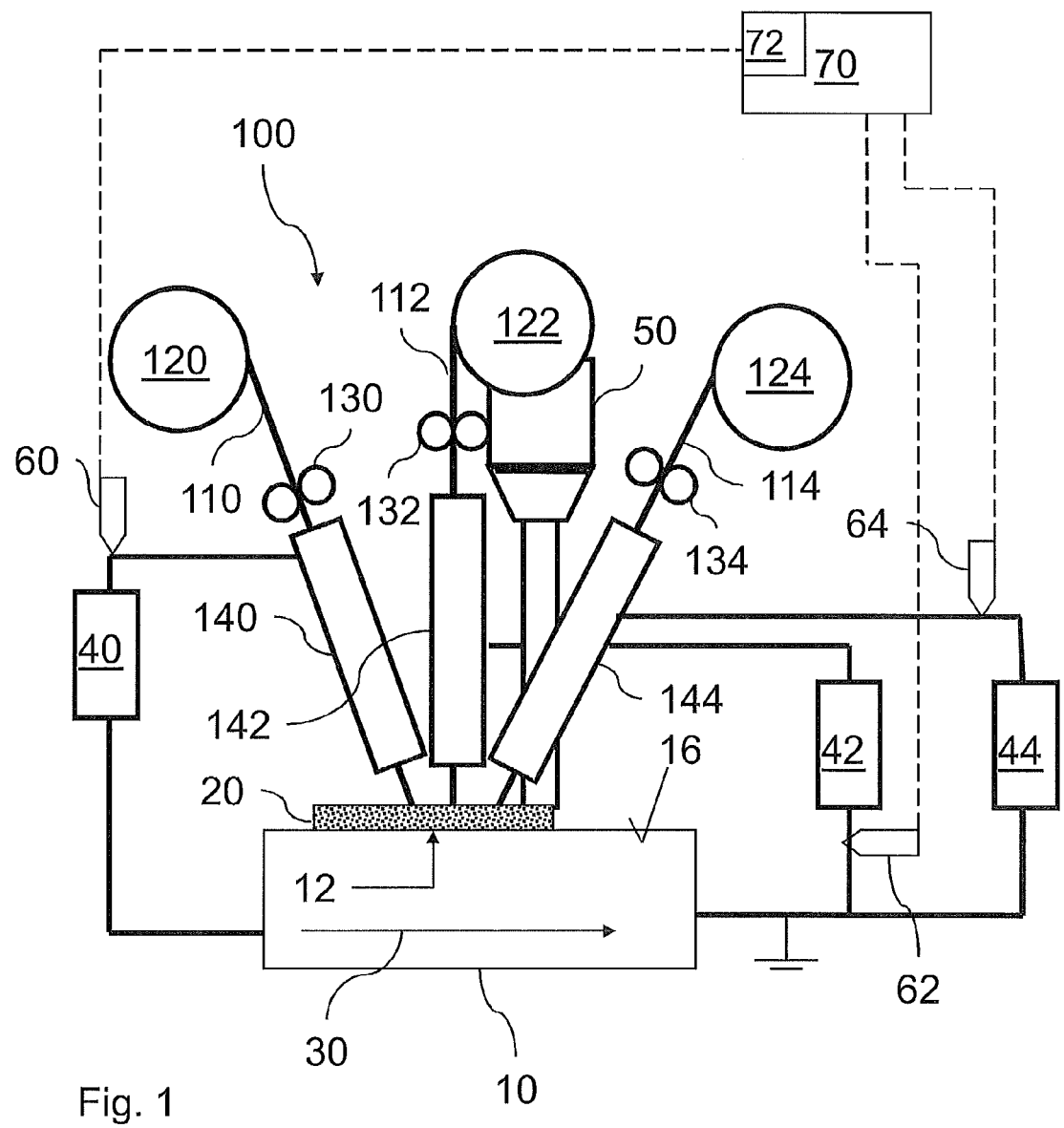
FIG. 1 an example embodiment of an apparatus for performing a method according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts schematically a welding arrangement for submerged arc welding comprising an electrode assembly 100 for welding a workpiece 10. In this example embodiment, the electrode assembly 100 comprises three electrodes 110, 112, 114 each held in a weld head jaw 140, 142, 144. The electrodes 110, 112, 114 are aligned to a weld seam (not shown) in sequential order and spaced apart in an equidistant manner.

Similar to MIG welding, submerged arc welding (SAW) involves formation of an arc between the continuously-fed bare wire electrodes 110, 112, 114 and the workpiece 10 while the electrode assembly 100 moves in welding direction 30. The electrodes 110, 112, 114 may be fed from coils 120, 122, 124 and guided by wire guides 130, 132, 134. Each electrode 110, 112, 114 may be supplied by a separate power source 40, 42, 44.

The process uses a flux to generate protective gases and slag, and to add alloying elements to the weld pool 12. An additional shielding gas is not required. Prior to welding, a thin layer 20 of flux powder is placed on the workpiece surface 16. The arc moves along a joint line in welding direction 30 and as it does so, flux is fed to the welding area by a flux feed hopper 50. As the arc is completely covered by the flux layer 20, heat loss is extremely low. This produces a thermal efficiency as high as 60%, compared with 25% for manual metal arc. There is no visible arc light, welding is virtually spatter-free and there is no need for fume extraction.

Submerged arc welding can be operated as a fully-mechanised or automatic process, but optionally it can be semi-automatic. Typical welding parameters are current, arc voltage and travel speed which all can affect bead shape, depth of penetration and chemical composition of the deposited weld metal.

Each electrode 110, 112, 114 is supplied with one or more sensor units 60, 62, 64 which monitoring one or more welding parameters such as current and/or arc voltage. The monitored parameter may be used as stability parameter for determining if the welding process at each electrode 110, 112, 114 is stable or if an instability occurs at one or more of the electrodes 110, 112, 114.

The sensor units 60, 62, 64 are coupled to a monitoring device 70 which comprises a unit 72 for determining if a stability criterion is violated by one of the electrodes.

Figure 2:
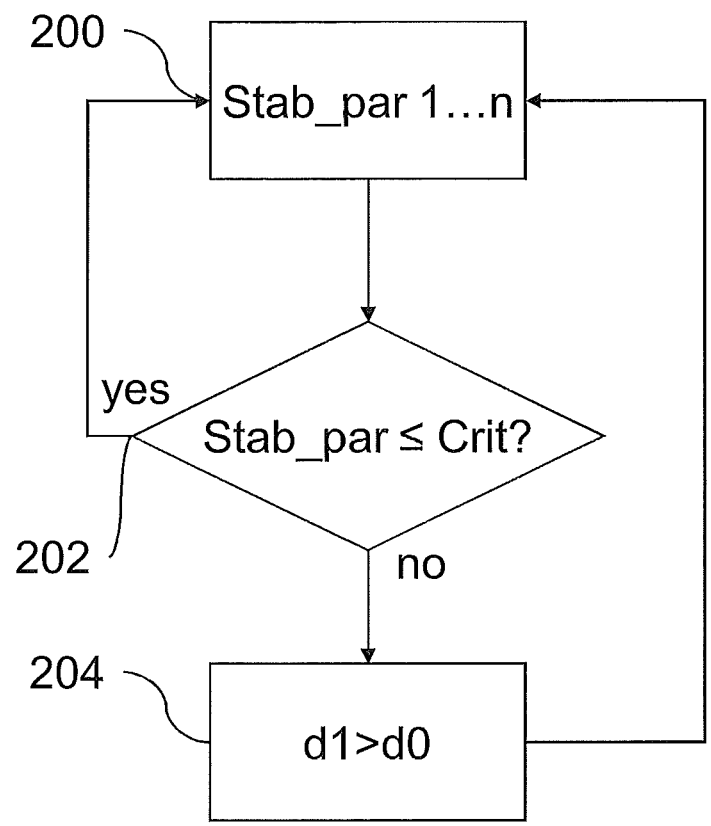
FIG. 2 a flow chart illustrating a procedure according to the invention.

FIG. 2 depicts a flow chart of a procedure for monitoring the stability of n electrodes of an electrode assembly, for instance n=3 for three electrodes 110, 112, 114 in FIG. 1.

In step 200 one or more stability parameters Stab_par are monitored for each electrode. In step 202 it is checked if the one or more stability parameters Stab_par are less or equal a predetermined stability criterion Crit. For instance, violation of the stability criterion Crit is detected when the stability parameter Stab_par of one or more of the electrodes changes by more than 5%, preferably by more than 10% with respect to the stability parameters of one or more adjacent electrodes, particularly of a leading electrode relative to a trailing electrode.

If the one or more stability parameters Stab_par is within the allowed range ("yes" in the flow chart), the routine jumps back to the monitoring step 200. If a violation of the one or more stability parameters Stab_par is detected ("no" in the flow chart), separating at least temporarily the electrode where the instability first occurs from one or more adjacent electrodes, particularly the electrode violating the stability criterion is separated from its leading electrode.

Figure 3A:
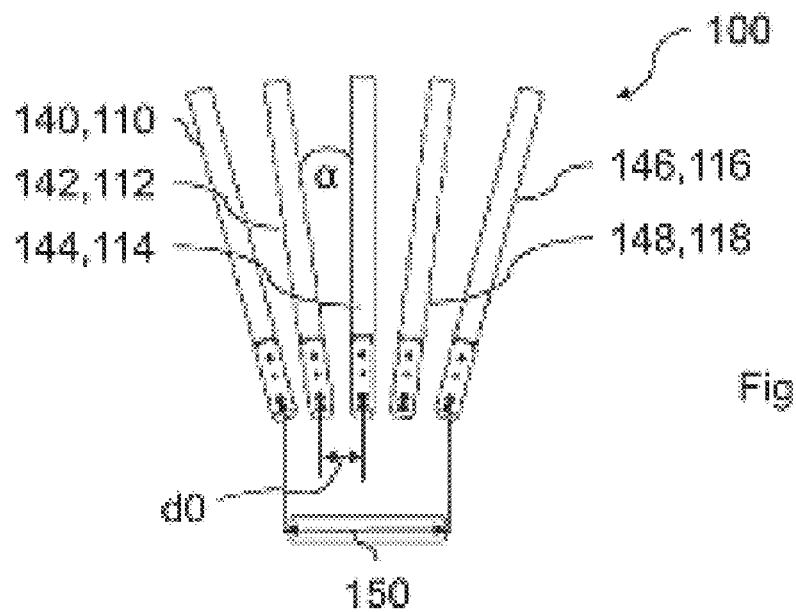
FIG. 3a, 3b an example embodiment of an electrode assembly comprising 5 electrodes (FIG. 3a) and the electrode assembly with electrodes separated in distance due to a stability criterion violation of one electrode (FIG. 3b).
Figure 3B:
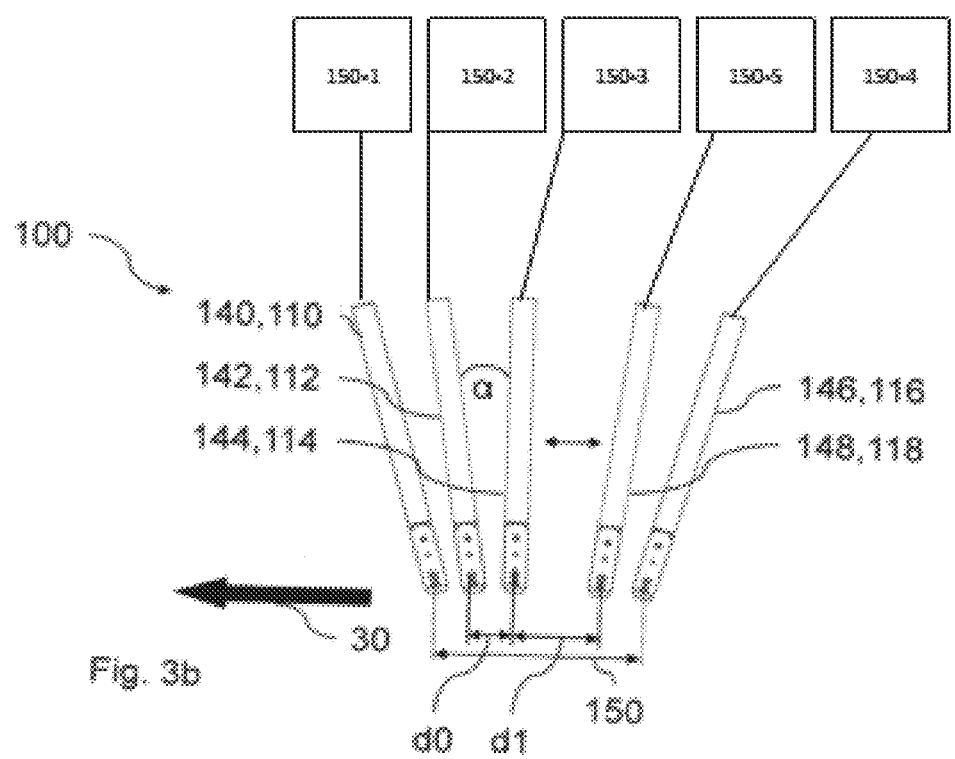

FIGS. 3a and 3b show an example of an electrode assembly 100 comprising five electrodes 110, 112, 114, 116, 118. The electrodes 110, 112, 114, 116, 118 are equidistantly spaced by a distance d0, and inclined towards each other by an angle α. The distance d0 is here shown as distance between the end of the weld head jaws 140, 142, 144, 146, 148. The wire electrodes 110, 112, 114, 116, 118 are collinear with a longitudinal extension of the weld head jaws 140, 142, 144, 146, 148. The weld head jaws 140, 142, 144, 146, 148 extend over a lateral distance 150 at their lower ends.

If a violation of the stability criterion Crit is detected at electrode 116, the equidistant sequential order of the electrodes 110, 112, 114, 116, 118 shown in FIG. 3a is changed and electrode 116 is separated from its leading electrode 114 according to a first embodiment by shifting the weld head jaw 146 laterally away from the weld head jaw 144 thus increasing the distance d0 to a larger distance d1.

According to another embodiment (not shown) the electrode 116 can be separated from its leading electrode 114 by tilting the weld head jaw 146 and subsequently the weld head jaw 148 of the other trailing electrode 118 thus increasing the distance d0 to a larger distance d1. The lateral distance 150 of the lower ends of the weld head jaws 140, 142, 144, 146, 148 increases subsequently.

According to another embodiment (not shown) the electrode 116 may be separated from its leading electrode 114 by shifting the weld head jaw 146 in a transverse direction thereby creating an arrangement where not all electrodes are aligned along the weld seam anymore.

The distance d0 can be preferably increased by a factor of 1.5, more preferably by a factor between 2 and 10, particularly by a factor between 2.5 and 5.

In the embodiment of FIG. 3b, actuators 150-1, 150-2, 150-3, 150-4 and 150-5 may be provided for separating electrodes 110, 112, 114, 116, and 118 during operation.

For instance, the increase in distance has been from the starting distance d0 of 20 mm to a distance d1 between 50 and 100 mm.

The electrode assembly 100 shown in FIG. 3b can also be a fixed electrode arrangement wherein the electrode 116 violating the stability criterion Crit has been determined by modelling and/or testing before the welding process. This is advantageous if such an electrode assembly 100 is used for routine welding processes with virtually constant requirements, for instance for welding large numbers of identical pipes.

Through this alteration welding with results within the desired quality levels can be achieved with previously unattained weld speeds. In a specific case it was shown that an increased distance by 100 mm between electrodes 114 and 115 in a 5-electrode system offered the sought after results. Of course, the numbers depend on the actual system and geometry and are only given for illustrating the effect. The numbers may differ in other arrangements.

The invention claimed is:

1. An electrode assembly for electric arc welding, comprising
    at least three fusible continuously-fed electrodes for generating a weld pool via electric arcs in a workpiece,
    wherein a weld head jaw is arranged for each of the at least three electrodes wherein the at least three electrodes are arranged in sequential order with respect to a welding direction when the electrode assembly is in an operating mode, and
    wherein at least one of the trailing electrodes is geometrically separated from its leading electrode laterally and/or transversally compared to one or more foregoing electrodes of the leading electrode, and
    wherein an actuator is provided for separating the at least one trailing electrode from its leading electrode during welding by increasing a distance between the at least one trailing electrode and its leading electrode when a monitored stability parameter (Stab-par) of one of the electrodes of the electrode assembly is observed or expected to change by more than 5% with respect to the stability parameters (Stab_par) of one or more adjacent electrodes of the electrode assembly.

2. The electrode assembly according to claim 1, wherein the trailing electrode is separated from its leading electrode by larger distance (d1) than the leading electrode from its foregoing electrode.

3. The electrode assembly according to claim 2, wherein a distance (d0) is increased by a factor of at least 1.5.

4. The electrode assembly according to claim 1, wherein separating the electrode is achieved by adjusting an angle (a) between the electrodes.

5. The electrode assembly according to claim 1, wherein the trailing electrode is separated from its leading electrode by an offset transverse to the welding direction.

6. The electrode assembly according to claim 1, wherein the separated electrode is selected based on an estimation of an instability during a welding process.

7. The electrode assembly according to claim 1, wherein there are five electrodes and, wherein the fourth electrode is separated from the third electrode by a larger distance (d1) than an equidistant spacing (d0) between the other subsequent electrodes.

8. An electric arc welding method, wherein an electrode assembly comprises at least three fusible continuously-fed electrodes acting on a workpiece for generating a weld pool via electric arcs, wherein the at least three electrodes are arranged in sequential order relative to a welding direction and laterally separated relative to each other, comprising:
    monitoring at least one stability parameter (Stab_par) for each electrode of the electrode assembly;
    determining if the stability parameter (Stab_par) of one electrode of the electrode assembly violates a stability criterion (Crit), wherein violation of the stability criterion is detected when the stability parameter (Stab_par) of one or more of the electrodes changes by more than 5%, with respect to the stability parameters (Stab_par) of one or more adjacent electrodes;
    separating at least temporarily the one electrode violating the stability criterion (Crit) from one or more adjacent electrodes when a violation of the stability criterion (Crit) of the one electrode is detected, by increasing a distance (d0) between the one electrode violating the stability criterion (Crit) and its foregoing electrode.

9. The method according to claim 8, comprising separating the one electrode by increasing the distance (d0) in lateral direction.

10. The method according to claim 8, wherein the distance (d0) is increased by a factor of at least 1.5.

11. The method according to claim 8, comprising separating the one electrode is performed by arranging one or more electrodes in a transverse direction with relation to the welding direction.

12. The method according to claim 8, comprising separating the one electrode by adjusting an angle (a) between the electrodes.

13. The method according to claim 8, comprising separating the one electrode by separating weld head jaws holding the electrodes.

14. The method according to claim 8, wherein an electric current and/or through the electrodes is monitored as stability parameter (Stab_par).

15. The method according to claim 8, wherein an arc voltage related to the electrodes is monitored as stability parameter (Stab_par).

16. The method according claim 8, wherein violation of the stability criterion is detected when the stability parameter (Stab_par) of one or more of the electrodes changes by more than 5%, with respect to the stability parameters (Stab_par) of the trailing electrode compared to its foregoing electrode.

17. The method according to claim 8, wherein the separation of the one electrode is performed during ongoing current flow through the electrodes.

18. An apparatus for performing an electric arc welding method, wherein an electrode assembly comprises at least three fusible continuously-fed electrodes acting on a workpiece for generating a weld pool via electric arcs, wherein the at least three electrodes are arranged in sequential order relative to a welding direction and laterally separated relative to each other, comprising:
- a monitoring device for monitoring at least one stability parameter (Stab_par) for each electrode of the electrode assembly;
- a unit for determining if the stability parameter (Stab_par) of one electrode of the electrode assembly violates a stability criterion (Crit) by determining whether the stability parameter (Stab_par) of one or more of the electrodes changes by more than 5%, with respect to the stability parameters (Stab_par) of one or more adjacent electrodes,
- wherein the electrode assembly is adapted for separating at least temporarily the one electrode violating the stability criterion (Crit) from one or more adjacent electrodes when a violation of the stability criterion (Crit) of the one electrode is detected, by increasing a distance (d0) between the one electrode violating the stability criterion (Crit) and its foregoing electrode.

19. The apparatus according to claim 18, wherein the electrode assembly comprises adjustable weld head jaws for laterally and/or transversally adjusting the position of an individual electrode above a surface of the workpiece.

20. The apparatus according to claim 18, wherein the electrode assembly comprises pivotable weld head jaws with adjustable angles (a).

* * * * *